(12) United States Patent
Hayashi et al.

(10) Patent No.: US 6,618,082 B1
(45) Date of Patent: Sep. 9, 2003

(54) DIGITAL CAMERA ADAPTED TO REPRODUCE AN ORIGINAL IMAGE AND A THUMBNAIL IMAGE

(75) Inventors: Hideto Hayashi, Daito (JP); Akira Toba, Osaka (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/104,170

(22) Filed: Jun. 25, 1998

(30) Foreign Application Priority Data

Jun. 27, 1997 (JP) .............................................. 9-171373

(51) Int. Cl.[7] .......................... H04N 5/76; H04N 5/225; H04N 5/222
(52) U.S. Cl. .............................. 348/231.99; 348/220.1; 348/333.05
(58) Field of Search ................................. 348/220, 231, 348/232, 207, 333.05, 363, 143, 220.1, 231.99, 231.3, 207.99; 358/909.1

(56) References Cited

U.S. PATENT DOCUMENTS

| | | | |
|---|---|---|---|
| 5,164,831 A | | 11/1992 | Kuchta et al. ............... 358/209 |
| 5,465,133 A | * | 11/1995 | Aoki et al. .................. 348/363 |
| 5,610,723 A | | 3/1997 | Yamagishi ................... 386/75 |
| 5,806,072 A | * | 9/1998 | Kuba et al. .................. 348/231 |
| 6,094,282 A | * | 7/2000 | Hoda et al. ............... 358/909.1 |
| 6,133,947 A | * | 10/2000 | Mikuni ........................ 348/143 |
| 6,147,703 A | * | 11/2000 | Miller et al. ................ 348/220 |
| 6,215,523 B1 | * | 4/2001 | Anderson .............. 384/333.05 |

FOREIGN PATENT DOCUMENTS

| | | |
|---|---|---|
| JP | 07-143426 | 6/1995 |
| JP | 07-245723 | 9/1995 |

* cited by examiner

Primary Examiner—Wendy R. Garber
Assistant Examiner—Luong Nguyen
(74) Attorney, Agent, or Firm—Armstrong, Westerman, & Hattori, LLP.

(57) ABSTRACT

A digital camera includes a button to renew a displayed image. If an operator depresses the renewing button for 2 seconds or longer, then a continuous reproducing mode is set. If a finger is released from the renewing button, the mode is switched from the continuous reproducing mode to a normal reproducing mode. A CPU, in the continuous reproducing mode, expands thumbnail image data and magnifies the expanded data to display the thumbnail images on an LCD. In the normal reproducing mode, on the other hand, original image data is expanded, and an expanded original image is displayed on the LCD. That is, the thumbnail images are reproduced in a continuous manner during depression of a reproducing button by the operator, while the thumbnail image is turned into an original image if the operator releases his finger from the reproducing button.

2 Claims, 7 Drawing Sheets

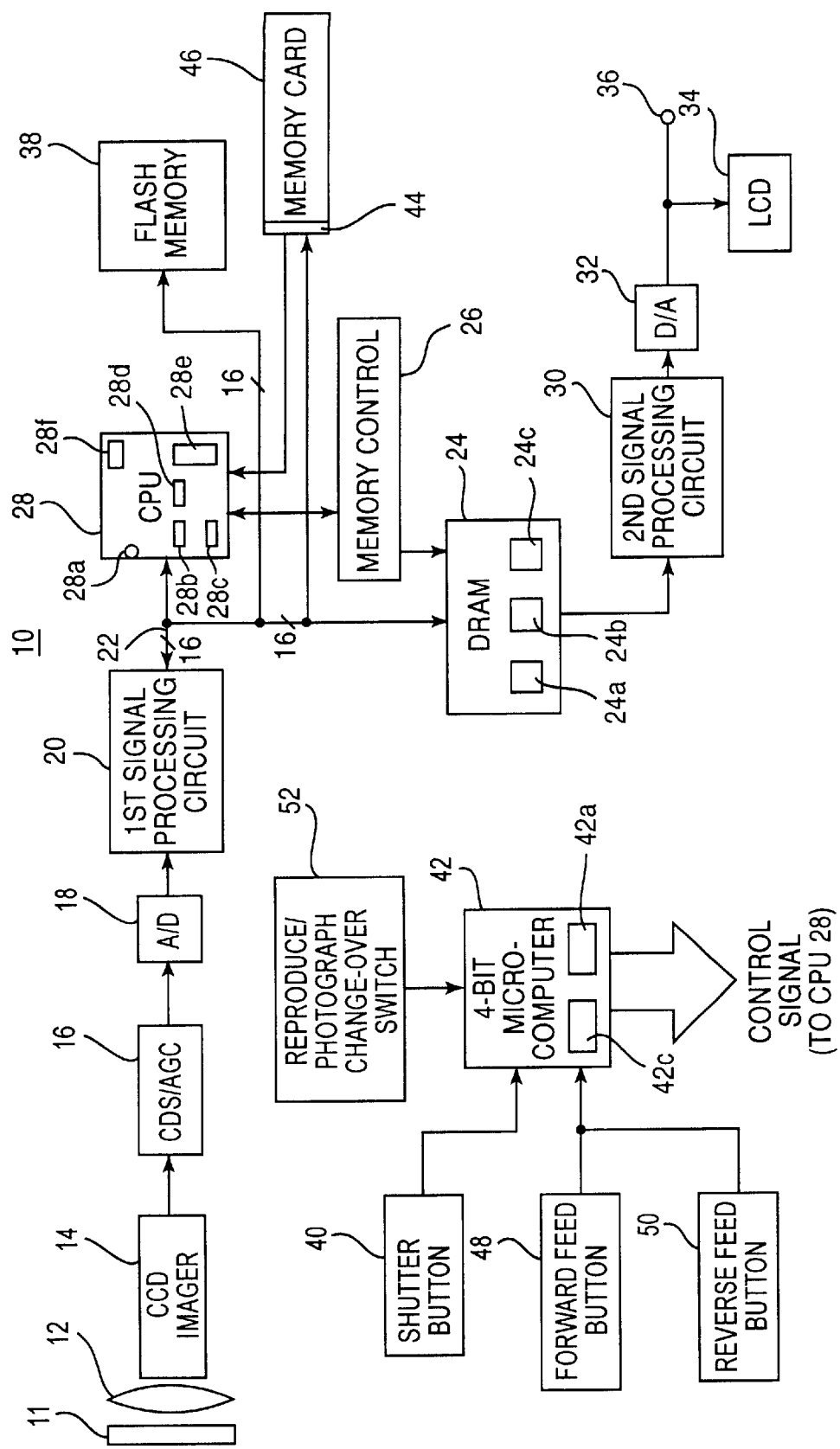

FIG. 2

| MARKER | EXPLANATION |
|---|---|
| SOI (Start of image) | START MARKER FOR IMAGE FILE |
| APP 0 | START MARKER FOR THUMBNAIL IMAGE DATA AREA |
| APP 12 | START MARKER FOR IMAGE INFORMATION AREA |
| DQT (Define Quantization Table) | START MARKER FOR QUANTIZATION TABLE DATA AREA |
| SOF (Start Of Frame) | START MARKER FOR PARAMETER AREA CONCERNING FRAME |
| DHT (Define Huffman Table) | START MARKER FOR HUFFMAN CODING TABLE DATA AREA |
| SOS (Start Of Scan) | START MARKER FOR PARAMETER AREA CONCERNING COMPONENT |
| NO MARKER | ORIGINAL IMAGE DATA AREA |
| EOI (End Of Image) | END MARKER FOR IMAGE FILE |

F I G. 3
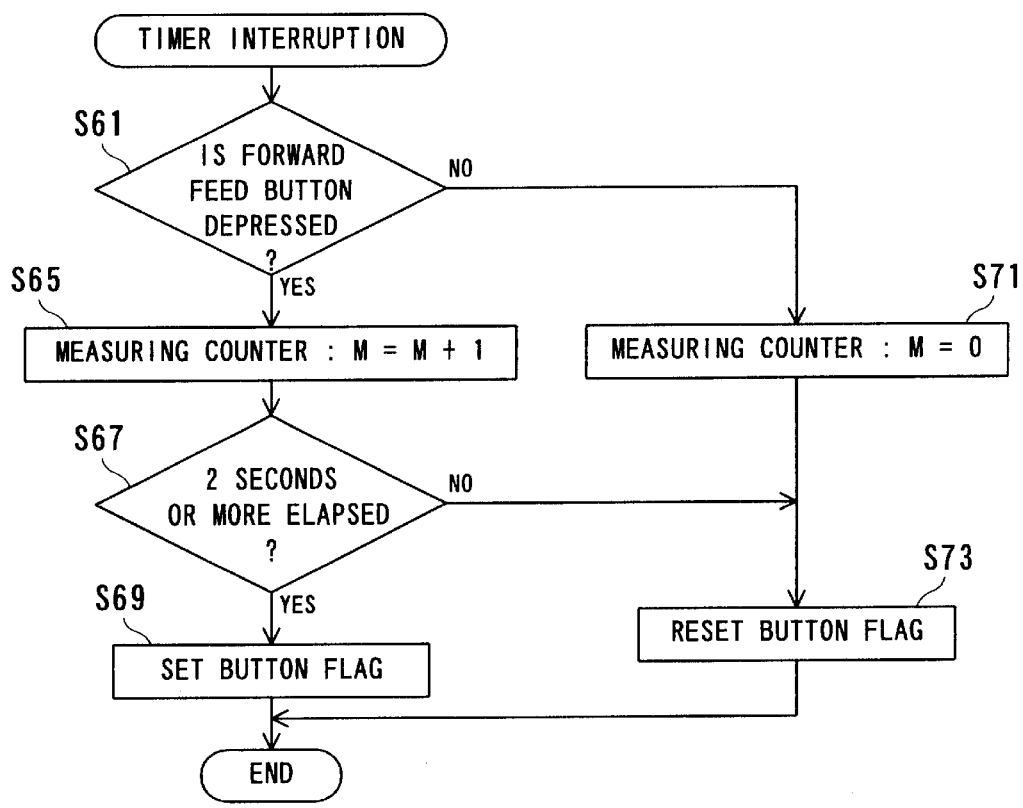

FIG. 7

(A) MEMORY CARD pic00006.jpg
pic00001.jpg
pic00004.jpg
pic00005.jpg
pic00002.jpg
pic00003.jpg (B) ENTRY TABLE NO.1  pic00001.jpg
NO.2  pic00002.jpg
NO.3  pic00003.jpg
NO.4  pic00004.jpg
NO.5  pic00005.jpg
NO.6  pic00006.jpg

DIGITAL CAMERA ADAPTED TO REPRODUCE AN ORIGINAL IMAGE AND A THUMBNAIL IMAGE

BACKGROUND OF THE INVENTION

Field of the Invention

This invention relates to digital cameras, and more particularly to a digital camera adapted to reproduce any one of thumbnail image and original image recorded through compression.

Description of the Prior Art

The conventional digital cameras are arranged to expand original image data in each of a normal reproducing mode and a continuous reproducing mode so that the expanded data can be displayed on an LCD.

However, it takes as long as about three seconds to expand the original image data. Therefore, there has been a difficulty in shortening the period of renewing the image in the continuous reproducing mode.

SUMMARY OF THE INVENTION

Therefore, it is an primary object of this invention to provide a digital still camera which is capable of shortening the time period of reproduced-image renewal in a continuous reproducing mode.

According to this invention, a digital camera adapted to reproduce any one of thumbnail image and original image, comprises: a mode setting means for setting any one of a normal reproducing mode and a continuous reproducing mode; an original image reproducing means for reproducing an original image in the normal reproducing mode; and a thumbnail image reproducing means for reproducing thumbnail images in a continuous manner in the continuous reproducing mode.

When a normal reproducing mode is set, an original image is reproduced by the original image reproducing means. On the other hand, when the continuous reproducing is set, thumbnail images are reproduced by the thumbnail image reproducing means.

In one aspect of this invention, a reproducing mode is switched over between the normal reproducing mode and the continuous reproducing mode, depending upon an operation of the indicating button used to indicate reproduced-image renewal.

In another aspect of this invention, the flag is set when the indicating button is in an on state, and the flag is reset when the indicating button is in an off state. A state of setting the flag is representative of the continuous reproducing mode, while a state of resetting the flag being representative of the normal reproducing mode.

In one embodiment of this invention, the flag is set when the on state of the indicating button continues for a predetermined time period. In this setting state, the thumbnail images are reproduced in a continuous manner. Incidentally, the thumbnail images are magnified to a size of the original image.

In another embodiment, the flag is reset when the indicating button is turned to the off state. In the setting state is produced the same original image as the thumbnail image lastly reproduced when the flag is reset. The original image is renewed each time the indicating button is depressed.

According to this invention, the thumbnail images are reproduced in the continuous reproducing mode. Accordingly, it takes less time to expand data, thereby shortening the period of reproduced-image renewal. Further, in the normal reproducing mode an original image is reproduced, thereby preventing against degradation in image quality.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing one embodiment of this invention;

FIG. 2 is an illustrative view showing image file forms;

FIG. 3 is a flowchart showing part of operation in the FIG. 1 embodiment;

FIG. 7 is an illustrative view showing part of operation in the FIG. 1 embodiment.

DETAILED DESCRIPTION OF THE PREFERRED EMBODIMENTS

Figure 4:
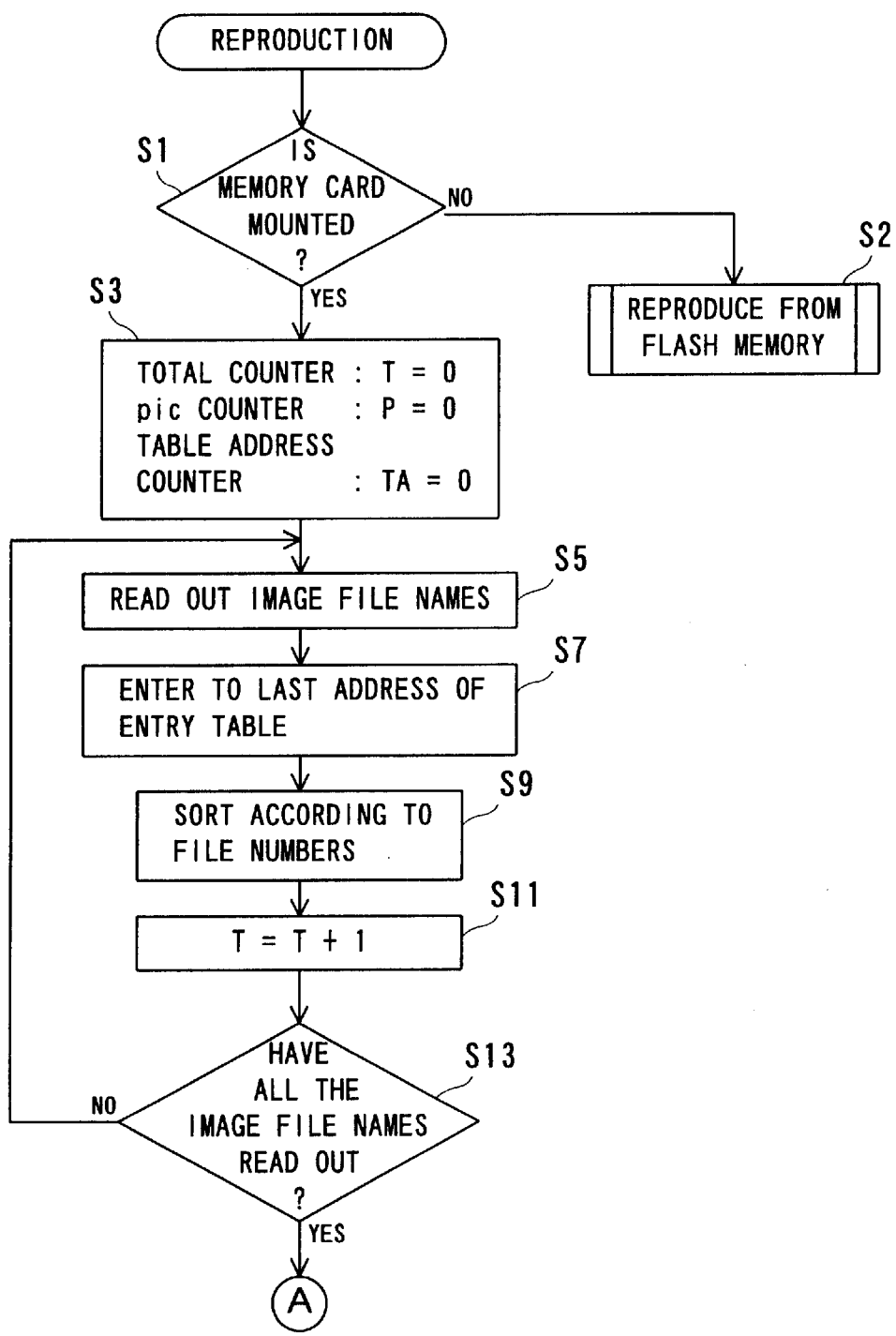
FIG. 4 is a flowchart showing another part of the operation in the FIG. 1 embodiment.

Referring to FIG. 1, a digital camera 10 of this embodiment includes a barrier 11 formed at a front of a main body thereof. If this barrier 11 is opened, a photographing mode is set. At the same time, an optical image incident upon a lens 12 is given to a CCD imager 14 through a color filter having $C_y$, $Y_e$, $M_g$ and G arranged in a mosaic form.

When outputting a motion picture through a monitor 34, the CCD imager 14 performs so-called well-known pixel mixing readout to supply a resulting pixel signal to a CDS/AGC circuit 16. The CDS/AGC circuit 16 performs well-known noise removal and level adjustment on the inputted pixel signal. The pixel signal processed by this CDS/AGC circuit 16 is then converted by an A/D converter 18 into digital data, i.e. pixel data. A first signal processing circuit 20 performs color separation and YUV-conversion on the pixel data outputted from the A/D converter 18.

The Y, U and V data thus created is written by a memory control circuit 26 into a memory area 24a of a DRAM 24 through a bus 22. Since this data to be written to the memory area 24a is progressive-scan data, the data in its form cannot be outputted through an interlace-scan schemed LCD 34. For this reason, the memory control circuit 26 temporarily writes the Y, U and V data into the memory area 24a. The Y, U and V data are thereafter read out by the same memory control circuit 26 according to an interlace-scan method.

When outputting a motion picture, the second signal processing circuit 30 performs predetermined horizontal and vertical interpolations on the Y, U and V data (motion picture data) read out of the DRAM 24 so that these data become suited for a display-screen size of the LCD 34. The motion picture data, outputted from the second signal processing circuit 30, is then converted by a D/A converter 32 into an analog signal. This analog signal is supplied to the LCD 34, and also outputted through an output terminal 36. As a result, a motion picture is displayed on the LCD 34.

When a shutter button 40 is depressed by an operator, a 4-bit micro-computer 42 supplies a control signal to a CPU 28 through an interrupt terminal 28a. In response thereto, the CPU 28 controls the CCD imager 14 to perform so-call all-pixel readout. The CCD imager 14 outputs pixel signals every line by the progressive scan method. Since the CCD imager 14 is mounted with a color filter in a mosaic form, $C_y$ and $Y_e$ are alternately outputted at an odd line, while $M_g$ and G are alternately outputted at an even line. The CDS/AGC circuit 16 performs noise removal and level adjustment on the pixel signal, similarly to the above. The A/D converter 18 converts the pixel signal from the CDS/AGC circuit 16 into digital data, i.e. pixel data. The CCD imager 14 is disabled after outputting 1 frame of pixel signals. The 1-frame pixel data created by the A/D converter 18 is directly supplied onto a bus 22 without processed by the first signal processing circuit 20. This 1-frame pixel data is written into the memory area 24a by the memory control circuit 26.

The CPU 28 performs color separation and YUV-conversion on the image data stored in the memory area 24a with using a working area 24b. The converted Y, U and V data, i.e. photographed image data, are compressed according to a JPEG format. The compressed data is accommodated within an image file. The image file, in turn, is recorded in a memory card 46. Incidentally, where no memory card 46 is applied to the digital still camera 10, the image file is recorded on a flash memory 38.

The memory control circuit 26 also reads $Y_e$, $C_y$, $M_g$ and G of the pixel data out of the memory area 24a by the interlace scan method, and supplies them to a second signal processing circuit 30. The second signal processing circuit 30, when a shutter button 40 is depressed, performs color separation and YUV-conversion on the inputted pixel data, thereby outputting a photographed image (freeze image) on the LCD 34.

The image file recorded in the memory card 46 is put with a marker, of as shown FIG. 2, at a predetermined address thereof. "SOI" is a start marker for an image file. Markers "APP0" and "APP12" are respectively start markers for a thumbnail image data area and an image information area, which have been contemplated by the present applicant. "DQT" is a start marker for a quantization table data area. "SOF" is a start marker for a parameter area concerning frames. "DHT" is a start marker for a Huffman coding table data area. "SOS" is a start marker for a parameter area concerning components. "EOI" is an end marker for the image file. Incidentally, an original image data area is provided following the parameter area concerning components.

The frame-related parameter area is written with the number of pixels of the image data. If the number of pixels is 640 pixels×480 lines, the information means that the resolution is at VGA. If the number of pixels is 1024 pixels×768 lines, it means that the resolution is at XGA. The image information area is written with a photographing date, a photographing condition such as on/off of a not-shown strobe, the presence or absence of protection setting, and so on. The thumbnail image data area is recorded with thumbnail image data under compression. The original image data is recorded with compressed original image data (photographed image data).

If a reproduce/photograph switch 52 is switched to a reproducing mode, a reproducing mode is set. The reproducing mode involves a normal reproducing mode and a continuous reproducing mode. In the normal reproducing mode, renewal is made for a displayed original image each time the operator once depresses a forward feed button 48 or reverse feed button 50. That is, the CPU 28 reads original image data out of a desired image file recorded in the memory card 46. The CPU 28 also performs expansion on the read image data by using a working area 24c, and stores the expanded original image data (YUV data) into the memory area 24a. The stored original image data is read out of the memory area 24a by the interlace-scan method. A second signal processing circuit 30 performs horizontal and vertical interpolations on the read original image data. As a result, a reproduced image is displayed on the LCD 34.

Incidentally, where no memory card 46 is applied, original image data is read from a desired image file recorded in an incorporated flash memory 38. However, the below explanations will be made principally on a case that the memory card 46 is applied.

If the operator continues to depress the forward feed button 48 or reverse feed button 50 for 2 seconds or longer, then a continuous reproducing mode is set. At this time, the CPU 28 reads thumbnail image data from respective image files at a predetermined interval and expands the read thumbnail image data, in order, with using the working area 24c. The expanded thumbnail image data is subjected by the second signal processing circuit 30 to horizontal and vertical interpolations and expanded to the screen size of the LCD 34. As a result, expanded thumbnail images are displayed for a predetermined time period on the LCD 34. In this manner, while the forward feed button 48 or reverse feed button 50 is being depressed, expanded thumbnail images are reproduced in a continuous manner.

When the operator releases his finger from the forward feed button 48 or reverse feed button 50, the continuous reproducing mode is switched to the normal reproducing mode. The CPU 28 reproduces the original image data corresponding to the thumbnail image being displayed immediately before switching over of the mode. Therefore, if the operator releases his finger from the forward feed button 48 or reverse feed button 50 at an instance that a desired thumbnail image is being displayed, the thumbnail image displayed on the LCD 34 turns into an original image, line by line, from a top thereof.

During continuous reproduction, thumbnail image data smaller in data amount is read out. Due to this, the period of renewing the reproduced image is shortened, thereby enabling high-speed reproduction. On the other hand, when the forward feed button 48 or reverse feed button 50 is turned off during displaying a desired thumbnail image, the thumbnail image being displayed turns into the original image. As a result, the quality of image display is improved.

The flash memory 38 is stored with a program corresponding to flowcharts shown in FIG. 3 to FIG. 6. When the reproducing mode is set, the 4-bit micro-computer 42 makes timer interruptions at a interval of 0.1 second to process on the flowchart shown in FIG. 3, and the CPU 28 processes on the flowcharts shown in FIG. 4 to FIG. 6.

Referring to FIG. 3, the 4-bit micro-computer 42 determines at a step S61 whether the forward feed button 48 is depressed or not. If "NO", the 4-bit microcomputer 42 resets, at a step S71, a measuring counter 42b, and resets a button flag 28f at a step S73, to end the process. On the other hand, if "YES" is determined at the step S61, the 4-bit micro-computer 42 causes a count value M of a counter 42a to increment at the step S65, and determines at a step S67 whether the count value M is exhibiting a value corresponding to 2 seconds.

The flowchart shown in FIG. 3 is executed by timer interruptions at an interval of 0.1 second, wherein the count value M is reset at a time that the forward feed button 48 or reverse feed button 50 is turned off. To achieve this, it is determined whether or not 2 seconds or more has elapsed after depressing the forward feed button 48 depending upon whether the count value M is exhibiting "20" or greater or not. If "YES" at the step S67, the 4-bit micro-computer 42 outputs, at a step S69, a control signal to set a button flag 28f, thereby ending the process. If "NO" at the step S67, the 4-bit micro-computer 42 outputs, at a step S73, a control signal to reset the button flag 28f to end the process.

With the flowchart configured like this, the button flag 28f is set at the time that the operator continues depressing the forward feed button 48 for 2 seconds, thereby setting the continuous reproducing mode. On the other hand, if the operator releases his finger from the forward feed button 48, the button flag 28f is promptly reset, returning the mode to the normal reproducing mode.

Incidentally, although the above explanation was based on the operation by the depression of the forward feed button 48, the process is carried out in a similar manner where the reverse feed button is depressed. That is, the depression of the reverse feed button 50 for 2 seconds or longer causes setting of the continuous reproducing mode, and releasing the finger from the reverse feed button 50 returns the mode to the continuous reproducing mode.

Figure 5:
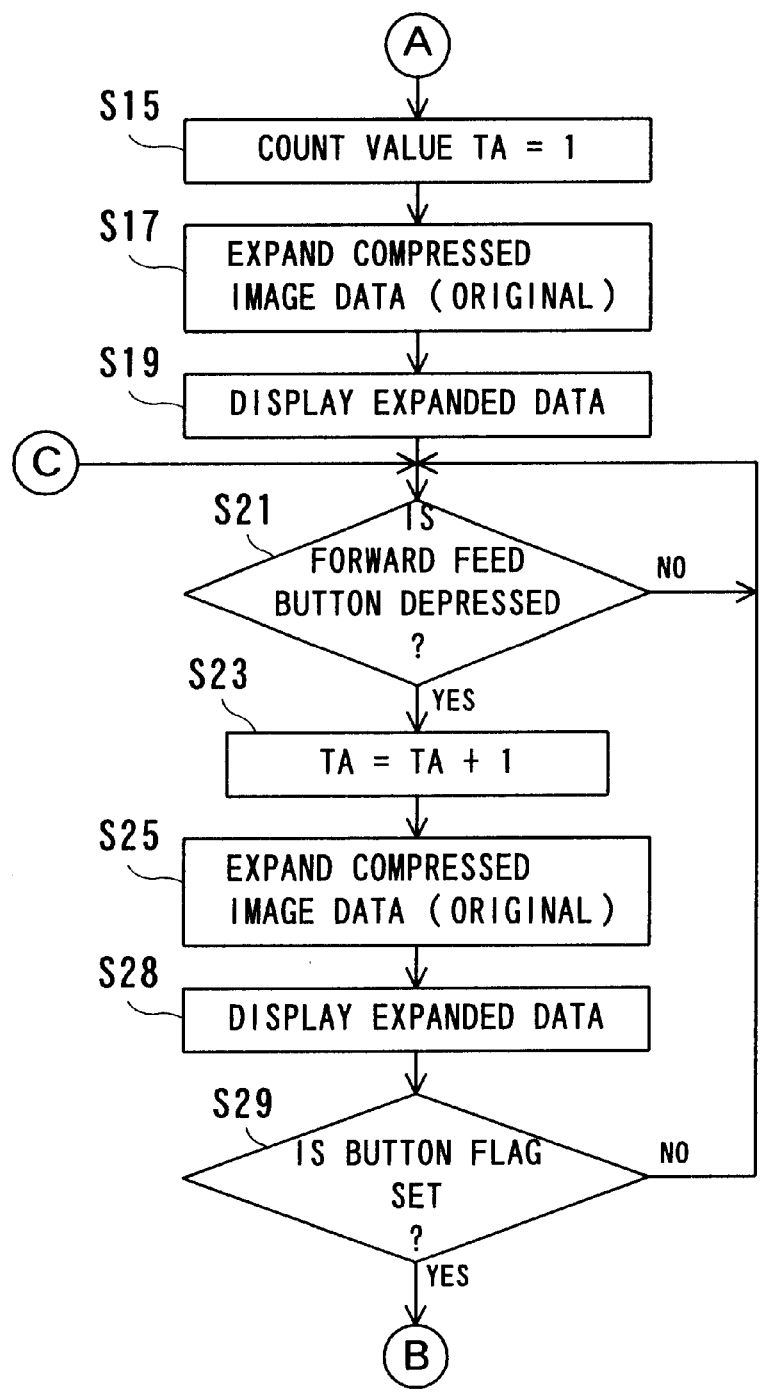
FIG. 5 is a flowchart showing a further part of the operation in the FIG. 1 embodiment.
Figure 6:
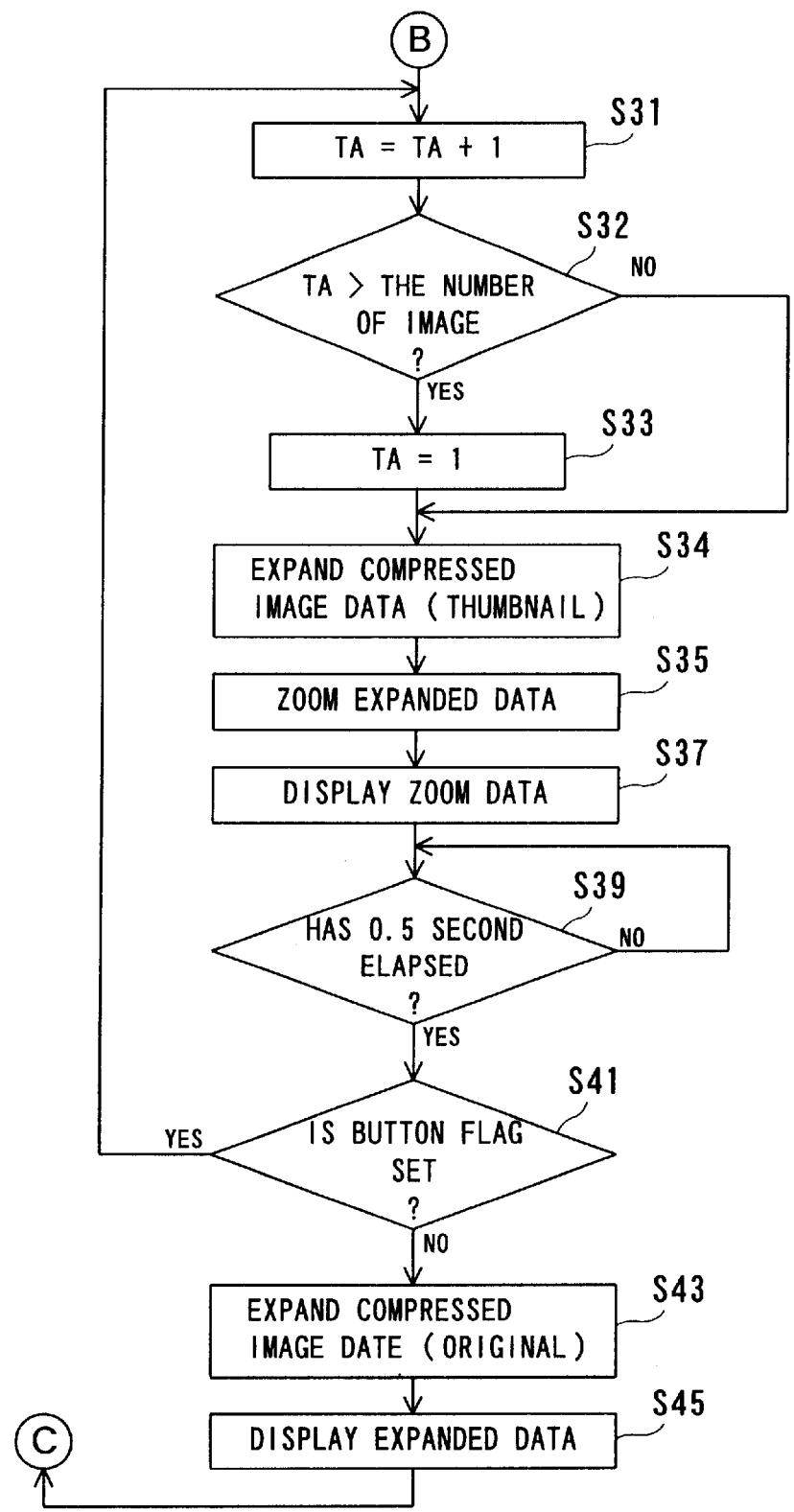
FIG. 6 is a flowchart showing still another part of the operation in the FIG. 1 embodiment.

Referring to FIG. 4 to FIG. 6, the CPU 28 in the reproducing mode first determines at a step S1 whether a memory card 46 is applied to a slot 44 or not. If the determination here is "NO", reproduction is made for the image data from the flash memory 38, detailed explanation thereof being omitted here. On the other hand, if "YES" at the step S1, the CPU 28 resets, at a step S3, the total counter 28b, the PIC counter 28c and the table address counter 28d. The CPU 28 then reads, at a step S5, any one of the image file names out of the memory card 46, and enters the read image file name to a last address of the entry table 28e at a step S7.

At a step S9, the image file names entered in the entry table 28e are sorted according to their file numbers, and then a count value T of the total counter is incremented at a step S11. The CPU 28 subsequently determines at a step S13 whether all the image file names have been read out of the memory card 46 or not. If "NO", the process returns to the step S5, while if "YES", the process proceeds to a step S15.

If the shifting to the reproducing mode is made when the image files are recorded, for example, in the order as shown in FIG. 7(A), in the memory card 46, these image file names are entered as shown in FIG. 7(B), i.e. in an order of power ascending in file number.

Referring to FIG. 5, the CPU 28 sets, at a step S15, a count value TA of the table address counter 28d at "1". At a step S17, original image data is read out of an image file corresponding to a current count value TA (=the entry table 28e number). The original image data thus read is expanded according to a JPEG format. The expanded original image data is displayed on the LCD 34 at a step S19. That is, if the mode is shifted to the reproducing mode, reproduction is first made for an image file smallest in file number. The CPU 28 subsequently determines at a step S21 whether the forward feed button 48 is depressed or not. If "YES", the count value TA is incremented at a step S23. At a step S25, original image data is read out of an image file corresponding to a current count value, and the read original image data is expanded according to a JPEG format. The original image is displayed on the LCD 34.

It takes about 3 seconds from the determination "YES" at the step S21 to the completion of the process at the step S27. Accordingly, the CPU 28 executes the step S29 after a lapse of about 3 seconds from the operation of the forward feed button 48. At a step S29, it is determined whether the button flag 28f is set or not.

The button flag 28f is set at a time that the depressing time period (on time period) of the forward feed button 48 exceeds 2 seconds. However, if the depression time period is kept for about 3 seconds, "YES" is determined at the step S29. Thereupon, the CPU 28 executes a process for the continuous reproducing mode at steps S31–S41.

On the other hand, if the operator releases his finger immediately after depressing the forward feed button 48, the flag 28f is set. Due to this, the CPU 28 determines "NO" at the step S29, to repeat the process for the normal reproducing mode by executing the steps S21–S29. That is, the original image is renewed each time the forward feed button 48 is depressed.

At a step S31, the CPU 28 increments the count value TA, and then determines at a step S32 whether the count value TA is greater than the number of recorded images. If the determination here is "NO", the process advances directly to a step S34, while if "YES", the count value is set at "1" at a step S33 and the process proceeds to the step S34. Accordingly, after a lastly-arranged image is reproduced. A firstly-arranged image is displayed. At the step S34, thumbnail image data is read out of an image file corresponding to a current count value TA to executing an expansion process. The thumbnail image data has pixels in number, i.e. 80 pixels×60 lines. On the other hand, the LCD 34 has pixels in number of 704 pixels×432 lines. Accordingly, the CPU 28 performs, at a step S35, a magnifying zoom process on the thumbnail image data to thereby create magnified thumbnail image data having 704 pixels×432 lines. That is, the second signal processing circuit 30 is caused to execute such a zoom process. Thus, magnified thumbnails are displayed on the LCD 34 at a step S37. At step S39, it is determined whether or not 0.5 second has elapsed from a time executing the step S31. If 0.5 seconds is elapsed, it is determined at a step S41 whether the button flag 42c is still being set or not. If "YES", the process returns to the step S31 to repeat the process as stated above. Due to this, magnified thumbnail images are each displayed for 0.5 second in a continuous manner.

The display of an original image requires a time period of approximately 3 seconds, whereas the display of thumbnail image data takes not longer than 0.5 second. It is therefore possible to continuously reproduce thumbnail images at a high speed while the forward feed button 48 is kept in depression.

If the forward feed button 48 is turned off, the button flag 42c is immediately reset so that the CPU 28 determines "NO" at a step S41. Because the count value TA is maintained at a same value without incrementation, the CPU 28 reads at a step S43 original image data from the same image file and expands the image data according to a JPEG format. Thereafter, the expanded data is outputted on the LCD 34 at a step S45, and the process returns to the step S21. That is, if the operator finds a desirable thumbnail image and releases his finger from the forward feed button 48, an original flag 42c is reset to thereby return the mode from the continuous reproducing mode to the normal reproducing mode. At this time, the thumbnail image being displayed on the LCD 34 is changed to an original image line by line, thus providing image representation with improved quality.

Incidentally, although the process by depressing the forward feed button 48 was explained based on FIG. 4 to FIG. 6, the depression of the reverse forward button 50 decrements the count value TA. In also this case, thumbnail images are reproduced in a continuous manner.

According this embodiment, since thumbnail images are reproduced in a continuous reproducing mode, it is possible to reduce the data expansion time and hence the renewing time period required for image production. Also, in the normal reproducing mode, an original image is reproduced, thereby preventing against degradation in image quality.

Incidentally, the memory card may use various cards such as SSFDC (Solid State Floppy Disc Card). Although in this embodiment a complementary-colored filter was used that has $Y_e$, $C_y$, $M_g$ and G arranged in a mosaic form, a primary-colored filter may be used that has R, G and B arranged in a mosaic form. Further, although FIG. 4 to FIG. 6 were explained using the memory card 46, the process will be similarly made for a case that a plurality of images are recorded on the flash memory 38.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for reproducing on a monitor screen any one of a first image of a first resolution and a second image of a second resolution lower than said first resolution, comprising:

a mode setter for setting any one of a normal reproducing mode and a continuous reproducing mode;

a first image reproducer for reproducing each of the first images when the normal reproducing mode is set; and a second image reproducer for enlarging each of the second images and reproducing each of the enlarged second images in a continuous manner when the continuous reproducing mode is set, wherein a size of the enlarged second image is equal to a size of said monitor screen.

2. A digital camera according to claim 1, wherein said mode setter is capable of alternately setting said modes by use of only a single button.

* * * * *